United States Patent [19]
Skanberg et al.

[11] Patent Number: 4,999,004
[45] Date of Patent: Mar. 12, 1991

[54] SEAT BELT PRE-TENSIONER

[75] Inventors: Enar T. Skanberg, Billdal; Lars B. Axelsson, Vargarda, both of Sweden

[73] Assignee: General Engineering (Netherlands) B.V., Utrecht, Netherlands

[21] Appl. No.: 433,003

[22] Filed: Nov. 8, 1989

[30] Foreign Application Priority Data

Nov. 14, 1988 [GB] United Kingdom ............... 8826609

[51] Int. Cl.5 .............................................. B60R 21/10
[52] U.S. Cl. .......................................... 297/480; 74/2; 280/806
[58] Field of Search ................ 297/478, 480; 280/806; 74/2

[56] References Cited

U.S. PATENT DOCUMENTS

| | | | |
|---|---|---|---|
| 2,650,655 | 9/1953 | Neahr et al. | 297/480 |
| 3,213,506 | 1/1973 | Lipschutz | 297/480 |
| 3,951,430 | 4/1976 | Schwanz et al. | 297/480 |
| 3,960,023 | 6/1976 | Gralinski | 74/2 |
| 3,967,506 | 7/1976 | Billot | 74/2 |
| 3,999,780 | 12/1976 | Matsuoka et al. | 297/480 X |
| 4,603,591 | 8/1986 | Sibley et al. | 74/2 |
| 4,932,722 | 6/1990 | Morozawa | 297/480 |

Primary Examiner—Peter A. Aschenbrenner
Attorney, Agent, or Firm—Spencer & Frank

[57] ABSTRACT

A pre-tensioner arrangement applies tension to a safety belt in response to deceleration of a vehicle. A spring stores a force which is to be applied to the safety belt. A trigger mechanism comprises a lever which exhibits a mechanical advantage, one end of the lever engaging the spring, or an element associated with the spring, to retain the spring in a compressed state, and the other end of the lever engaging an over-dead-center linkage. An inertia mass is provided to engage the over-dead-center linkage to move it through the dead-center condition to release the lever and cause the spring to be released when severe deceleration is experienced.

18 Claims, 2 Drawing Sheets

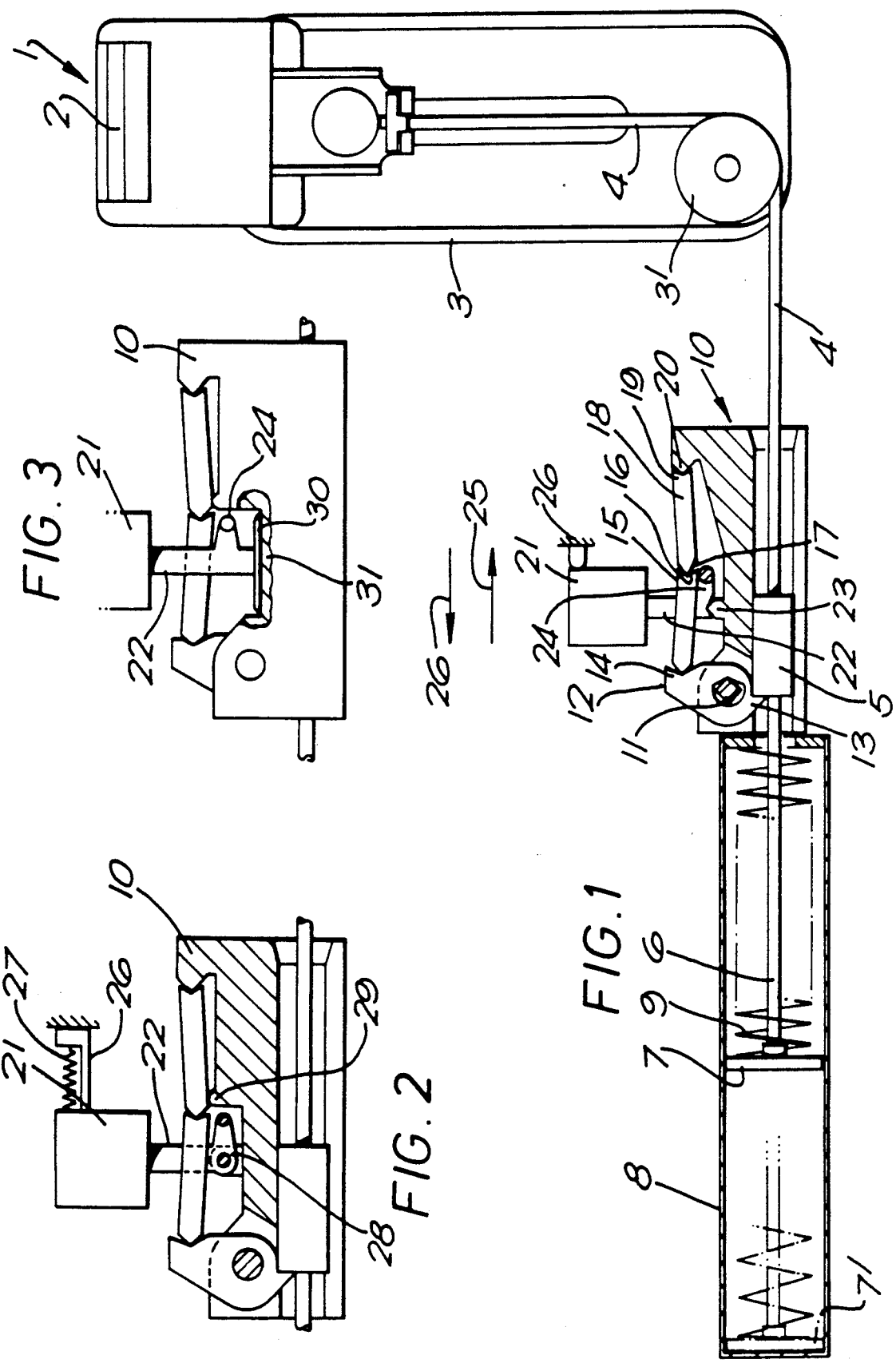

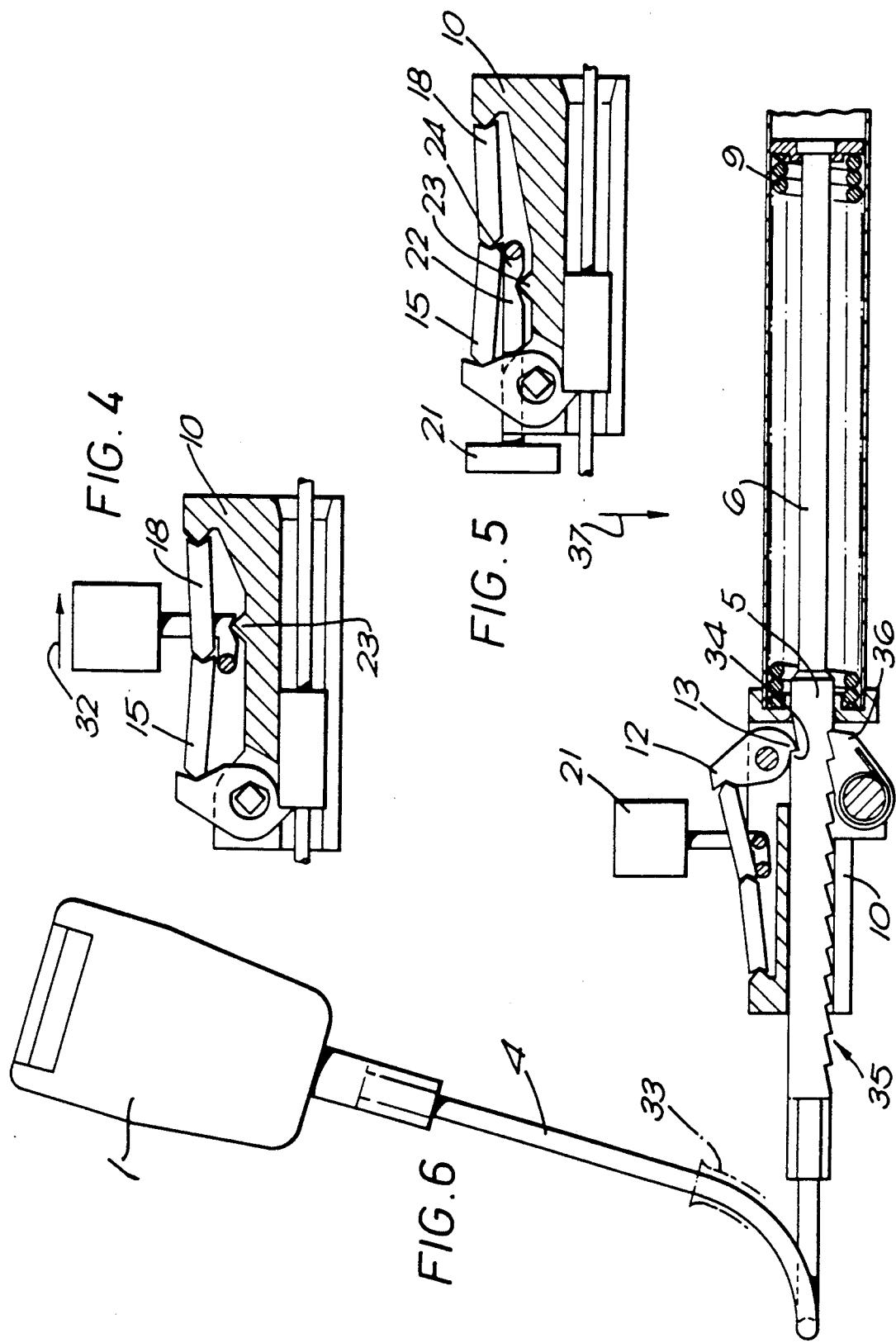

SEAT BELT PRE-TENSIONER

BACKGROUND TO THE INVENTION

It has been proposed previously to provide, in a vehicle such as a car, a seat belt pre-tensioner which is an arrangement adapted to apply a positive tension to the seat belt in the event that an accident arises. Such a pre-tensioner comprises means to apply tension to the seat belt, or to a fitting associated with the seat belt, and means to initiate operation of the device in response to an accident occurring.

FR 2 282 303 discloses a pre-tensioner which is connected to a buckle into which a tongue mounted on the seat belt is connected. The pre-tensioner comprises a piston-and-cylinder arrangement, the cylinder containing an explosive charge which is triggered electrically in response to an accident being detected, for example in response to severe deceleration of the vehicle. When the explosive charge is ignited the piston is caused to move up the cylinder, thus effectively applying tension to the safety belt. In alternative examples present in this Specification the explosive charge is used to draw one end of a wire or cable into the cylinder, the other end of the wire or cable being wound on a drum formed on a shaft of a retractor reel. The arrangement is such that as the cable is drawn into the cylinder, the shaft of the retractor reel is caused to rotate, thus applying tension to the safety belt.

In a further arrangement disclosed in this French Specification 2 382 903 the plunger is mounted within the cylinder, and is biassed in one direction by means of a mechanical force-storing device constituted by a spring. However, the plunger is retained in an initial position by means of an over-dead-centre link which serves to lock the plunger. A solenoid is provided adapted to move the over-dead-centre link through the dead-centre position, thus effectively freeing the plunger and enabling the plunger to move under the spring bias applied thereto.

All the arrangements disclosed in the French Specification have their disadvantages. Each of them requires an electric signal to be generated in response to an accident occurring, this electrical signal either triggering an explosive, or operating a solenoid to move a linkage through a dead-centre position. It takes a period of time, albeit a brief period of time, for an electrical signal to trigger an explosive and for an electrical signal to actuate a solenoid. It is to be appreciated that if a seat belt pre-tensioner is to be of value, it is important that the tension is applied to the seat belt as soon as an accident detected. If there is any delay, even if it is a brief delay, the tension may be applied to the seat belt too late to be of any real value.

Various other attempts have been made to provide a seat belt pre-tensioner with an appropriate arrangement to trigger operation of the pre-tensioner, and the present invention seeks to provide an improved arrangement which operates in a satisfactory and reliable manner, but which is relatively economic to fabricate.

BRIEF SUMMARY OF THE INVENTION

According to one aspect of this invention there is provided a pre-tensioner arrangement adapted to apply tension to a safety belt in response to severe deceleration of a vehicle in which the arrangement is fitted, which arrangement comprises force-storing means adapted to store force and adapted to apply the force to a safety belt or to a device associated with the safety belt, and a trigger comprising a pivotted lever which exhibits a mechanical advantage, one end of the lever being adapted to engage part of the pre-tensioner arrangement for retaining the force-storing means in a predetermined condition, the other end of the lever engaging an over-dead-centre linkage which prevents the lever from moving pivotally, there being an inertia mass adapted to move in a predetermined way when subjected to said severe deceleration, the inertia mass having means thereon adapted to engage the over-dead-centre linkage and to move the over-dead-centre linkage through the dead-centre condition to release the lever so that the said one end can move under the force from the force-storing means, thus causing the said one end of the lever to be disengaged from said part and the force-storing means to be released to move the safety belt or the said device associated with the safety belt.

Preferably the over-dead-centre linkage comprises two links, the means on the inertia mass adapted to engage the linkage being adapted to engage said two links substantially at or adjacent their point of connection.

Conveniently the links comprising the over-dead-centre linkage are interconnected to articulate in a substantially friction-free manner.

Advantageously each link of the linkage is provided with a substantially knife-edge or pointed end which is received within an appropriate recess to constitute a substantially friction-free articulation.

Preferably the inertia weight is mounted on a shaft, said shaft being aligned with a point about which the inertia weight rotates when subject to said severe deceleration, the shaft having a cranked extension to engage the over-dead-centre linkage.

Conveniently the inertia weight is mounted on a shaft which terminates in a flat disc, the inertia weight being tiltable about the edge of the disc.

Preferably the inertia weight is mounted on the disc by means of a shaft, the shaft carrying a lateral extension, the lateral extension comprising the means to engage the over-dead centre linkage.

Conveniently the inertia weight is mounted for pivotal or tilting movement about a point which is off-set from the point at which the means to engage the over-dead-centre linkage actually engage that linkage.

Preferably said lever comprise a pivotally mounted member defining, on one side of the pivot axis thereof, an abutment face for engaging said part of the pre-tensioner arrangement, and defining on the other side of the pivot axis thereof a portion to engage said over-dead-centre linkage.

Conveniently the trigger incorporates a ratchet mechanism adapted to engage an element. which moves when the force-storing means are released.

According to another aspect of this invention there is provided a pre-tensioner arrangement adapted to apply tension to a safety belt in response to severe deceleration of a vehicle in which the arrangement is fitting, which arrangement comprises force-storing means adapted to store force and adapted to apply the force to a safety belt or to a device associated with the safety belt, provided with a trigger as described above.

Preferably the force-storing means comprise a spring.

Conveniently the spring is connected by means of a cable or wire to a device associated with a safety belt.

Advantageously the device associated with the safety belt comprises a buckle adapted to receive a tongue mounted on a safety belt.

Alternatively the means associated with the safety belt comprises a reel on which part of the safety belt is wound.

Preferably the buckle is slidably mounted on a guide track or rail, the arrangement being such that the buckle moves along the guide track or rail when the force storing means is released.

Conveniently a ratchet mechanism is provided on said track or rail adapted to retain the buckle in its final position.

Preferably an element is provided, defining an abutment face engagable with said lever, the element being subjected to a force tending to move the element by the force-storing means.

INTRODUCTION TO THE DRAWINGS

In order that the invention may be more readily understood and so that further features thereof may be appreciated, the invention will now be described, by way of example, with reference to the accompanying drawings in which FIG. 1 is a perspective view of one embodiment of a seat belt pre-tensioner arrangement with a trigger in with the invention, FIG. 2 a partial view of a modified embodiment of the invention, FIG. 3 a further partial view of another modified embodiment the invention, FIG. 4 a further modified view of another embodiment of the invention, FIG. 5 is another partial view of yet another embodiment of the , and FIG. 6 is a view of another seat belt pretensioner arrangement with a trigger in accordance with the invention.

DESCRIPTION OF PREFERRED EMBODIMENTS

Referring initially to FIG. 1 of the drawings a seat belt pre-tensioner arrangement in accordance with the invention comprises a seat belt buckle 1, of conventional design, which is adapted to receive a tongue mounted on a seat belt. The buckle 1 is provided with a release button 2, and may be of a substantially conventional design. The buckle is mounted for sliding movement within a rail or guide 3, which is securely anchored to the body or chassis of the motor vehicle. The rail or guide 3 may contain a ratchet mechanism (not shown).

Connected to the buckle 1 is a wire or cable 4 which passes around a jockey wheel 3' mounted on the track 3. The cable 4 extends to an enlarged head 5 formed on one end of a rod 6, the other end of which carries a plunger 7 which is received within a cylinder 8. A compression spring 9 is contained within the cylinder located between the plunger 7 and the end of the cylinder through which the rod 6 extends.

The pre-tensioner arrangement as described is provided with a trigger. A fixed housing 10 is mounted in position adjacent the head 5 formed on the rod 6. Pivotally mounted on the housing 10, about a pivot axis 11 is a restraining member 12, which defines an abutment surface 13 which, in one pivotal position of the restraining member 12 engages one end face of the head 5 provided on the rod 6, thus preventing the rod 6 from moving under the bias applied thereto by the compression spring 9. At a further position on the restraining member 12, on the opposite side of the axis of pivoting thereof is a recess 14 in which is received one end, which presents a knife edge or a point, of an elongate member 15 which defines, at its other end a recess 16 which receives one end 17 of a further elongate member 18. The end 17 of the member 18 may also present a knife edge or a point. The further elongate member 18 has the other end 19 thereof recessed which engages an abutment 20 formed on the housing 10. The abutment 20 may also be in the form of a knife edge or a point. The arrangement is such that the elongate members 15 and 18 form a two-part link which is in an over-dead-centre condition, the point of connection between the end 17 and the recess 16 being off-set from a straight line between the projection 20 and the recess 14. The links are all associated with low-friction articulations defined by the knife edges or points received in the respective recesses.

An inertia mass 21 is provided mounted on a shank 22 which is pivotal about a pivot point 23. There is a lateral extension 24 of the shank, which extends perpendicularly to the axis of the main portion of the shank 22. The projection 24 engages the two links 15,18 in the region of their connection between the recessed end 16 and the non-recessed end 17. The inertia mass 21 is restrained from moving in the direction of the arrow 25 by means of a stop 26, but is free to move in the direction of the arrow 26.

The arrangement, as described above, is mounted in a motor vehicle which is intended to travel in the direction of the arrow 26. If the vehicle is involved in an accident such that the driver of the vehicle or a passenger in the vehicle is to be restrained in their seat, then the vehicle will suffer severe deceleration as considered in the direction of movement as indicated by the arrow 26. The inertia mass 21 will, under such conditions, continue to move forward, relatively to the rest of the described arrangement, in the direction of the arrow 26. The inertia mass 21 will thus pivot about the pivot point 23 which engages the shank 22, and the projection 24 will thus move the point of connection of the two links 15 and 18 through the dead-centre condition, and the two links will then be freed from each other and from the rest of the apparatus.

The restraining member 12 will then be free to rotate about the axis 11, and consequently the force applied to the plunger 7 by the compression spring 9 will move the plunger to the left as shown in FIG. 1, to the position indicated in dashed lines 7'. As the plunger moves to the left tension will be applied to the wire 4 which will cause the buckle 1 to move down the guide or rail 3, thus applying tension to the seat belt which is connected to the buckle 1. Consequently, in response to a sensed deceleration, the pre-tensioner is triggered.

It will be appreciated that the described arrangement has the advantage that it is totally mechanical. There are no electrical components present in the described device, and thus the device acts in an instantaneous manner. As soon as the inertia weight 21 senses a deceleration which is sufficient to enable it to pivot about the projection 23, moving the links 15 and 18 through the "dead-centre" condition, the pre-tensioner is actuated, applying tension to the safety belt. The buckle 1 is thus pulled down the guide 3 and is retained by the ratchet mechanism.

It is to be noted that the links 15 and 18 are mounted in such a way that friction can only exhibit a minimal effect. Each link has one end which is a knife edge or point received in a recess. Also the point of pivotal connection between the housing 10 and the shank 22 associated with the inertia weight 21 may also be a knife-edge arrangement or a point arrangement thus giving rise to a minimum of friction. The restraining member 12 may be mounted on appropriate low-friction bearings or the like.

The restraining member acts as a lever, providing a mechanical advantage. The recess 14 is located much further from the pivot axis than the distance between the abutment face 13 and the pivot axis. Thus only a relatively small proportion of the force exerted by the spring 9 is applied to the links 15,18. Thus only a relatively low force must be applied to the links to move them through the dead-centre condition. Consequently the inertia mass 21 need not be very large, thus keeping manufacturing costs to a minimum.

FIG. 2 illustrates a modified embodiment of the invention. It is to be noted that in this embodiment of the invention the inertia mass 21, whilst being associated with a stop 26 is also associated with a spring 27 tending to retain the inertia mass 21 in its initial illustrated position. The purpose of this spring 27 is to provide the arrangement with a suitable degree of sensitivity. Without the spring 27 the inertia mass may move forwardly, triggering the pre-tensioner if the driver of the vehicle brakes suddenly, without an accident occurring.

It is also to be noted in the arrangement of FIG. 2 that the lower end of the shank 22 is provided with trunions 28 received within appropriate bearings formed in the housing 10. It is also to be noted that the housing 10 defines a projection 29 against which the links 15,18 rest before they are moved past the dead-centre position.

FIG. 3 illustrates a further modified embodiment of the invention, in which the inertia mass 21 stands on a shaft 22 which terminates in a flat horizontal disc 30 which stands on a platform 31 defined by the housing 10. The shank 22 is still provided with a projection 24 of the general configuration as described above. The inertia weight 21 must be subjected to sufficient deceleration to cause the inertia weight to be able to tilt about the free edge of the disc 30 before the illustrated arrangement will actuate the pre-tensioner. The disc 30 may be of an oval shape, and thus this arrangement may be sensitive not only to deceleration aligned with the intended direction of movement of the vehicle, but also deceleration substantially aligned with the intended direction of movement of the vehicle but off-set therefrom by a number of degrees.

FIG. 4 illustrates a further embodiment of the invention which is very similar to the embodiment illustrated in FIG. 1, save that the projection 23 formed by the housing 10 is, in this embodiment, located to the right of the connection between the two links 15,18. This arrangement is therefore intended to sense deceleration as considered in the direction of the arrow 32.

FIG. 5 illustrates another embodiment of the invention which is designed to sense deceleration when considering the direction of the arrow 33. In this embodiment of the invention the inertia weight 21 is mounted on a shaft 22 which has a linear extension 24 provided beyond the point which engages the projection 23 formed on that housing 10 about which the shaft 22 is pivotally mounted. It is the projection 24 which engages the two links 15,18 of the over-dead-centre linkage.

It is to be appreciated that the arrangements illustrated in FIGS. 4 and 5 are examples of arrangements within the scope and spirit of the invention which enable designers a certain degree of flexibility as to precisely where the various essential components of an arrangement in accordance with the invention are located in a motor vehicle.

It is to be appreciated that in the examples of the invention as described above, whilst the trigger arrangement incorporating the inertia mass and the over-dead-centre linkage has been illustrated as being located immediately adjacent the spring 9, the trigger could be located at any convenient position, provided that the restraining member can engage an appropriate abutment formed on an element which is biassed by the spring 9. Thus an appropriate head 5 could be formed at any convenient point on the wire or cable 4 to engage with the restraining member 12.

FIG. 6 illustrates a modified embodiment of the invention in which the elongate wire 4 from the buckle 1 passes through an appropriate tubular guide 33, which may be of any convenient design, before passing to the force-storage arrangement.

In this embodiment of the invention the head 5 mounted on the rod 6 is of significant size. The head 5 presents an abutment face 34 to engage with the abutment 13 provided on the rotary restraining member 12. However, in other regards the restraining member 12 and the linkage 15,16 are as described with reference to FIGS. 1 and 2 above, although certain features of design are slightly different.

However, it is to be noted that the head 5 is provided with a serrated under-surface 35, which forms ratchet teeth and the housing 10 incorporates a pivotally mounted spring biassed ratchet member 36 positioned to engage with the ratchet teeth 35.

It will be appreciated that the embodiment of the invention illustrated with reference to FIG. 6 operates broadly in the same way as the embodiment illustrated with reference to FIG. 1. When the inertia mass 21 moves the over-dead-centre linkage is moved over-centre, thus releasing the restraining member 12, which subsequently rotates, permitting the head 5 to be moved to the right, as shown in FIG. 6, by the mechanical force-storing means as represented by the spring 9. Thus the cable 4 is drawn through the guide 33, causing the buckle 1 to move downwardly. The ratchet member 36 will engage the ratchet teeth 35 when the head 5 has been drawn to the right by the spring 9, thus retaining the head 5 in its new position.

It is to be appreciated that in the described embodiments of the invention, a force-storing means is utilized adapted to store a force which is constituted by a spring. Of course, other mechanical force-storing means could be provided, such as a piston and cylinder arrangement filled with compressed gas, or a torsion bar and in this Specification the term "force-storing means" is intended to embrace such arrangements.

Whilst the invention has been described with reference to specific examples it is to be appreciated that many modifications may be made without departing from the scope of the invention as defined by the following Claims.

Whilst the invention has been described with reference to embodiments in which a buckle is pulled down by a wire or cable, the invention also relates to embodiments where a safety belt is wound onto a shaft, such as the shaft of a retractor reel, by a pull exerted on a wire or cable initially wound round the shaft or a driving mechanism for the shaft.

What is claimed is:

1. A trigger for a pre-tensioner arrangement adapted to apply tension to a safety belt in response to severe deceleration of a vehicle in which the arrangement is fitted, which arrangement comprises force-storing means adapted to store force and adapted to apply the force to a safety belt or to a device associated with the safety belt, and a trigger comprising a pivotted lever which exhibits a mechanical advantage, one end of the lever being adapted to engage part of the pretensioner arrangement for retaining the force-storing means in a predetermined condition, the other end of the lever engaging an over-dead-centre linkage, which prevents the lever from moving pivotally, there being an inertia mass adapted to move in a predetermined way when subjected to said severe deceleration, the inertia mass having means thereon adapted to engage the over-dead-centre linkage and to move the over-dead-centre linkage through the dead-centre condition to release the lever so that the said one end can move under the force from the force-storing means, thus causing the said one end of the lever to be disengaged from said part and the force-storing means to be released to move the safety belt or the said device associated with the safety belt.

2. A trigger according to Claim 1 wherein the over-dead-centre linkage comprises two links, the means on the inertia mass adapted to engage the linkage being adapted to engage said two links substantially at or adjacent their point of connection.

3. A trigger according to Claim 1 wherein the links comprising the over-dead-centre linkage are interconnected to articulate in a substantially friction-free manner.

4. A trigger according to Claim 3 wherein each link of the linkage is provided with a substantially knife-edge or pointed end which is received within an appropriate recess to constitute a substantially friction-free articulation.

5. A trigger according to Claim 1 wherein the inertia weight is mounted on a shaft, said shaft being aligned with a point about which the inertia weight rotates when subject to said severe deceleration, the shaft having a cranked extension to engage the over- dead-centre linkage.

6. A trigger according to Claim 1 wherein the inertia weight is mounted on a shaft which terminates in a flat disc, the inertia weight being tiltable about the edge of the disc.

7. An arrangement according to Claim 6 wherein the inertia weight is mounted on the disc by means of a shaft, the shaft carrying a lateral extension, the lateral extension comprising the means to engage the over-dead centre linkage.

8. An arrangement according to Claim 1 wherein the inertia weight is mounted for pivotal or tilting movement about a point which is off-set from the point at which the means to engage the over-dead-centre linkage actually engage that linkage.

9. A trigger according to Claim 1 wherein said lever comprise a pivotally mounted member defining, on one side of the pivot axis thereof, an abutment face for engaging said part of the pre-tensioner arrangement, and defining on the other side of the pivot axis thereof a portion to engage said over-dead-centre linkage.

10. A trigger according to Claim 1 incorporating a ratchet mechanism adapted to engage an element which moves when the force-storing means are released.

11. A pre-tensioner arrangement adapted to apply tension to a safety belt in response to severe deceleration of a vehicle in which the arrangement is fitting, which arrangement comprises force-storing means adapted to store force and adapted to apply the force to a safety belt or to a device associated with the safety belt, provided with a trigger, the trigger adapted to apply tension to a safety belt in response to severe deceleration of a vehicle in which the arrangement is fitted, which arrangement comprises force-storing means adapted to store force and adapted to apply the force to a safety belt or to a device associated with the safety belt, and a trigger comprising a pivoted lever which exhibits a mechanical advantage, one end of the lever being adapted to engage part of the pretensioner arrangement for retaining the force-storing means in a predetermined condition, the other end of the lever engaging an over-dead-centre linkage, which prevents the lever from moving pivotally, there being an inertia mass adapted to move in a predetermined way when subjected to said severe deceleration, the inertia mass having means thereon adapted to engage the over-dead-centre linkage and to move the over-dead-centre linkage through the dead-centre condition to release the lever so that the said one end can move under the force from the force-storing means, thus causing the said one end of the lever to be disengaged from said part and the force-storing means to be released to move the safety belt or the said device associated with the safety belt.

12. A pre-tensioner arrangement according to Claim 11 wherein the force-storing means comprise a spring.

13. A pre-tensioner arrangement according to Claim 11 wherein the spring is connected by means of a cable or wire to a device associated with a safety belt.

14. A pre-tensioner arrangement according to Claim 13 wherein the device associated with the safety belt comprises a buckle adapted to receive a tongue mounted on a safety belt.

15. A pre-tensioner arrangement according to Claim 13 wherein the means associated with the safety belt comprises a reel on which part of the safety belt is wound.

16. A pre-tensioner arrangement according to Claim 14 wherein the buckle is slidably mounted on a guide track or rail, the arrangement being such that the buckle moves along the guide track or rail when the force storing means is released.

17. An arrangement according to Claim 16 wherein a ratchet mechanism is provided on said track or rail adapted to retain the buckle in its final position.

18. An arrangement according to Claim 11 wherein an element is provided, defining an abutment face engagable with said lever, the element being subjected to a force tending to move the element by the force-storing means.

* * * * *